(12) United States Patent
Shimizu et al.

(10) Patent No.: US 10,239,406 B2
(45) Date of Patent: Mar. 26, 2019

(54) HYBRID VEHICLE

(71) Applicant: TOYOTA JIDOSHA KABUSHIKI KAISHA, Toyota-shi, Aichi-ken (JP)

(72) Inventors: Yu Shimizu, Toyota (JP); Takashi Ando, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/866,529

(22) Filed: Jan. 10, 2018

(65) Prior Publication Data
US 2018/0222329 A1    Aug. 9, 2018

(30) Foreign Application Priority Data

Feb. 6, 2017  (JP) .................................. 2017-019513

(51) Int. Cl.
| | |
|---|---|
| *B60L 3/00* | (2006.01) |
| *B60L 9/18* | (2006.01) |
| *B60K 6/445* | (2007.10) |
| *B60L 11/04* | (2006.01) |
| *B60W 10/26* | (2006.01) |
| *B60W 20/30* | (2016.01) |
| *B60W 10/08* | (2006.01) |

(52) U.S. Cl.
CPC ............. *B60L 11/04* (2013.01); *B60K 6/445* (2013.01); *B60L 3/003* (2013.01); *B60W 10/26* (2013.01); *B60W 20/30* (2013.01); *B60L 9/18* (2013.01); *B60W 10/08* (2013.01)

(58) Field of Classification Search
USPC .............................................. 290/17; 701/22
See application file for complete search history.

(56) References Cited

U.S. PATENT DOCUMENTS

| | | | | |
|---|---|---|---|---|
| 7,482,769 | B2 * | 1/2009 | Kutsuna ................. | B60W 20/50 318/254.1 |
| 7,997,364 | B2 * | 8/2011 | Hashimoto ........... | B60W 20/10 180/65.265 |
| 8,040,083 | B2 * | 10/2011 | Okamura .............. | H02P 29/032 318/139 |
| 8,424,624 | B2 * | 4/2013 | Oyama .................. | B60K 6/365 180/65.265 |

(Continued)

FOREIGN PATENT DOCUMENTS

| | | |
|---|---|---|
| JP | 2013-203116 | 10/2013 |
| JP | 2014-113003 | 6/2014 |

*Primary Examiner* — Pedro J Cuevas
(74) *Attorney, Agent, or Firm* — Finnegan, Henderson, Farabow, Garrett & Dunner, LLP (57) ABSTRACT

During a predetermined drive in which the hybrid vehicle is driven with operation of the engine in such a state that the first inverter and the second inverter are shut down, the hybrid vehicle controls the engine and the step-up/down converter such that the hybrid vehicle is driven with output of a torque from a first motor to a driveshaft via a planetary gear by decreasing the voltage of the high voltage-side power line to be lower than a reverse voltage of the first motor in the range of not lower than a lower limit control voltage that is higher than an allowable lower limit voltage. The hybrid vehicle increases the lower limit control voltage during the predetermined drive, compared with the lower limit control voltage during a drive other than the predetermined drive.

9 Claims, 5 Drawing Sheets

(56) References Cited

U.S. PATENT DOCUMENTS

| | | | | |
|---|---|---|---|---|
| 8,442,727 | B2* | 5/2013 | Yamamoto | B60W 10/24 701/49 |
| 8,543,271 | B2* | 9/2013 | Yamamoto | B60K 6/445 180/65.265 |
| 8,624,426 | B2* | 1/2014 | Kato | B60K 6/445 307/9.1 |
| 8,723,457 | B2* | 5/2014 | Komatsu | B60W 10/28 318/139 |
| 8,751,081 | B2* | 6/2014 | Kato | B60K 6/445 180/65.275 |
| 8,909,397 | B2* | 12/2014 | Aridome | B60W 20/10 701/22 |
| 9,296,289 | B2* | 3/2016 | Yamamoto | B60W 20/40 |
| 9,707,957 | B2* | 7/2017 | Shimizu | B60W 20/50 |
| 9,878,620 | B2* | 1/2018 | Mitsutani | B60L 3/0084 |
| 9,969,269 | B2* | 5/2018 | Nomura | B60K 6/40 |
| 9,987,947 | B2* | 6/2018 | Kamatani | B60L 3/0046 |
| 10,005,454 | B2* | 6/2018 | Matsumura | H02P 29/60 |
| 10,011,265 | B2* | 7/2018 | Kishimoto | B60W 20/13 |
| 2007/0138986 | A1* | 6/2007 | Kutsuna | B60W 20/50 318/400.21 |
| 2009/0021198 | A1* | 1/2009 | Okamura | H02P 29/032 318/400.3 |
| 2009/0211826 | A1* | 8/2009 | Hashimoto | B60W 20/10 180/65.275 |
| 2010/0065357 | A1* | 3/2010 | Oyama | B60K 6/365 180/65.265 |
| 2010/0087976 | A1* | 4/2010 | Aridome | B60W 20/50 701/22 |
| 2011/0087395 | A1* | 4/2011 | Yamamoto | B60K 6/445 701/22 |
| 2012/0013184 | A1* | 1/2012 | Kato | B60K 6/445 307/9.1 |
| 2012/0041630 | A1* | 2/2012 | Yamamoto | B60W 20/40 701/22 |
| 2012/0049771 | A1* | 3/2012 | Komatsu | B60W 10/28 318/139 |
| 2012/0065828 | A1* | 3/2012 | Kato | B60W 20/10 701/22 |
| 2012/0072063 | A1* | 3/2012 | Kato | B60K 6/445 701/22 |
| 2012/0143425 | A1* | 6/2012 | Yamamoto | B60W 10/24 701/22 |
| 2016/0031429 | A1* | 2/2016 | Yukawa | B60K 6/44 701/22 |
| 2016/0229309 | A1* | 8/2016 | Mitsutani | B60L 3/0084 |
| 2016/0318416 | A1* | 11/2016 | Kamatani | B60L 3/0046 |
| 2016/0332529 | A1* | 11/2016 | Kumazawa | B60L 1/003 |
| 2017/0072942 | A1* | 3/2017 | Shibata | B60K 6/365 |
| 2017/0088125 | A1* | 3/2017 | Shimizu | B60W 20/50 |
| 2017/0088127 | A1* | 3/2017 | Matsumura | H02P 29/60 |
| 2017/0096135 | A1* | 4/2017 | Kishimoto | B60W 20/50 |
| 2017/0113680 | A1* | 4/2017 | Shimizu | B60K 6/26 |
| 2017/0120891 | A1* | 5/2017 | Kishimoto | B60W 20/13 |
| 2017/0259668 | A1* | 9/2017 | Nomura | B60K 6/40 |
| 2017/0327003 | A1* | 11/2017 | Oyanagi | B60L 15/20 |
| 2018/0029473 | A1* | 2/2018 | Nishimura | B60K 6/46 |
| 2018/0043788 | A1* | 2/2018 | Kuribara | B60L 3/0046 |
| 2018/0065487 | A1* | 3/2018 | Hori | B60L 11/1809 |
| 2018/0105043 | A1* | 4/2018 | Migita | H02H 9/00 |
| 2018/0134277 | A1* | 5/2018 | Ito | B60W 20/15 |
| 2018/0154759 | A1* | 6/2018 | Shimizu | B60K 6/445 |
| 2018/0154884 | A1* | 6/2018 | Shimizu | B60W 20/10 |
| 2018/0201137 | A1* | 7/2018 | Hirasawa | H02P 6/12 |
| 2018/0222322 | A1* | 8/2018 | Shimizu | B60W 20/14 |
| 2018/0297584 | A1* | 10/2018 | Shimizu | B60W 20/50 |

* cited by examiner

HYBRID VEHICLE

CROSS-REFERENCE TO RELATED APPLICATIONS

The present disclosure claims priority to Japanese Patent Application No. 2017-019513 filed Feb. 6, 2017, which is incorporated herein by reference in its entirety including specification, drawings and claims.

TECHNICAL FIELD

The present disclosure relates to a hybrid vehicle.

BACKGROUND

A proposed configuration of a hybrid vehicle includes an engine; a first motor; a planetary gear mechanism including a carrier, a sun gear and a ring gear that are respectively connected with the engine, the first motor and an output member coupled with drive wheels; a second motor connected with the output member; an inverter configured to drive the first motor and the second motor; a battery; and a converter provided between the inverter and the battery (as described in, for example, JP 2013-203116A). When the hybrid vehicle is driven with operation of the engine in the state that the inverter is shut down, this hybrid vehicle controls the engine, such that a reverse voltage generated accompanied with rotation of the first motor becomes higher than a dc voltage of the inverter, based on the dc voltage of the inverter, a rotation speed of the output member and an operation amount of an accelerator. This control regulates a braking torque generated due to the reverse voltage of the first motor and regulates a reactive torque (i.e., driving torque generated in the output member) of this braking torque.

SUMMARY

An inverter-less drive in which the hybrid vehicle is driven with operation of the engine in the state that the inverter is shut down is likely to have a large effect such as a control delay of the converter and is likely to have a large variation in dc voltage of the inverter, compared with an ordinary drive in which the hybrid vehicle is driven with operation of the engine along with driving of the first motor and the second motor by the inverter. When the same value as that during the ordinary drive is set to a lower limit control voltage (i.e., voltage higher than an allowable lower limit voltage suitable for control of the converter) of the dc voltage of the inverter during the inverter-less drive, the dc voltage of the inverter is likely to become lower than the allowable lower limit voltage. This is likely to cause a failure in appropriately regulating the dc voltage of the inverter and to increase a variation in reactive torque (driving torque).

A hybrid vehicle of the present disclosure mainly aims to suppress a dc voltage of an inverter from becoming lower than an allowable lower limit voltage suitable for control of a converter when the hybrid vehicle is driven with operation of an engine in the state that the inverter is shut down.

In order to achieve the above primary object, the hybrid vehicle of the present disclosure employs the following configuration.

The present disclosure is directed to a hybrid vehicle. The hybrid vehicle includes an engine, a first motor configured to generate a reverse voltage accompanied with rotation, a planetary gear configured to include three rotational elements that are connected with three axes of the first motor, the engine, and a driveshaft coupled with drive wheels, such as to be arrayed in an alignment chart in a sequence of the first motor, the engine and the driveshaft, a second motor connected with the driveshaft, a first inverter configured to drive the first motor, a second inverter configured to drive the second motor, a power storage device, a step-up/down converter connected with a low voltage-side power line that is connected with the power storage device, and with a high voltage-side power line that is connected with the first inverter and the second inverter, and configured such that an electric power is transmitted with a change in voltage between the low voltage-side power line and the high voltage-side power line and a control device configured to control the engine, the first inverter, the second inverter and the step-up/down converter, such that the hybrid vehicle is driven with regulating a voltage of the high voltage-side power line in a range of not lower than a lower limit control voltage that is higher than an allowable lower limit voltage. During a predetermined drive in which the hybrid vehicle is driven with operation of the engine in such a state that the first inverter and the second inverter are shut down, the control device controls the engine and the step-up/down converter such that the hybrid vehicle is driven with output of a torque from the first motor to the driveshaft via the planetary gear by decreasing the voltage of the high voltage side power line to be lower than a reverse voltage of the first motor in the range of not lower than the lower limit control voltage, and the control device increases the lower limit control voltage during the predetermined drive, compared with the lower limit control voltage during a drive other than the predetermined drive.

The hybrid vehicle of this aspect controls the engine, the first inverter, the second inverter and the step-up/down converter, such that the hybrid vehicle is driven with regulating the voltage of the high voltage-side power line in the range of not lower than the lower limit control voltage that is higher than the allowable lower limit voltage. The "allowable lower limit voltage" denotes a lower limit of a voltage range suitable for control of the step-up/down converter (for appropriately regulating the voltage of the high voltage-side power line). During the predetermined drive in which the hybrid vehicle is driven with operation of the engine in the state that the first inverter and the second inverter are shut down, the hybrid vehicle controls the engine and the step-up/down converter such that the hybrid vehicle is driven with output of the torque from the first motor to the driveshaft via the planetary gear by decreasing the voltage of the high voltage-side power line to be lower than the reverse voltage of the first motor in the range of not lower than the lower limit control voltage. When a dc voltage of the first inverter and the second inverter is lower than the reverse voltage of the first motor, a regenerative torque due to the reverse voltage is generated in the first motor. The hybrid vehicle is then driven with output of a driving torque based on this regenerative torque to the driveshaft. The hybrid vehicle increases the lower limit control voltage during the predetermined drive, compared with the lower limit control voltage during the drive other than the predetermined drive. This configuration suppresses the voltage of the high voltage-side power line from becoming lower than the allowable lower limit voltage, compared with a configuration that sets the same value as that during the drive other than the predetermined drive to the lower limit control voltage during the predetermined drive. As a result, this reduces a failure in appropriately regulating the voltage of the high voltage-side power line and reduces an increase in variation of the driving torque.

DESCRIPTION OF EMBODIMENTS

The following describes some aspects of the disclosure with reference to embodiments.

Figure 1:
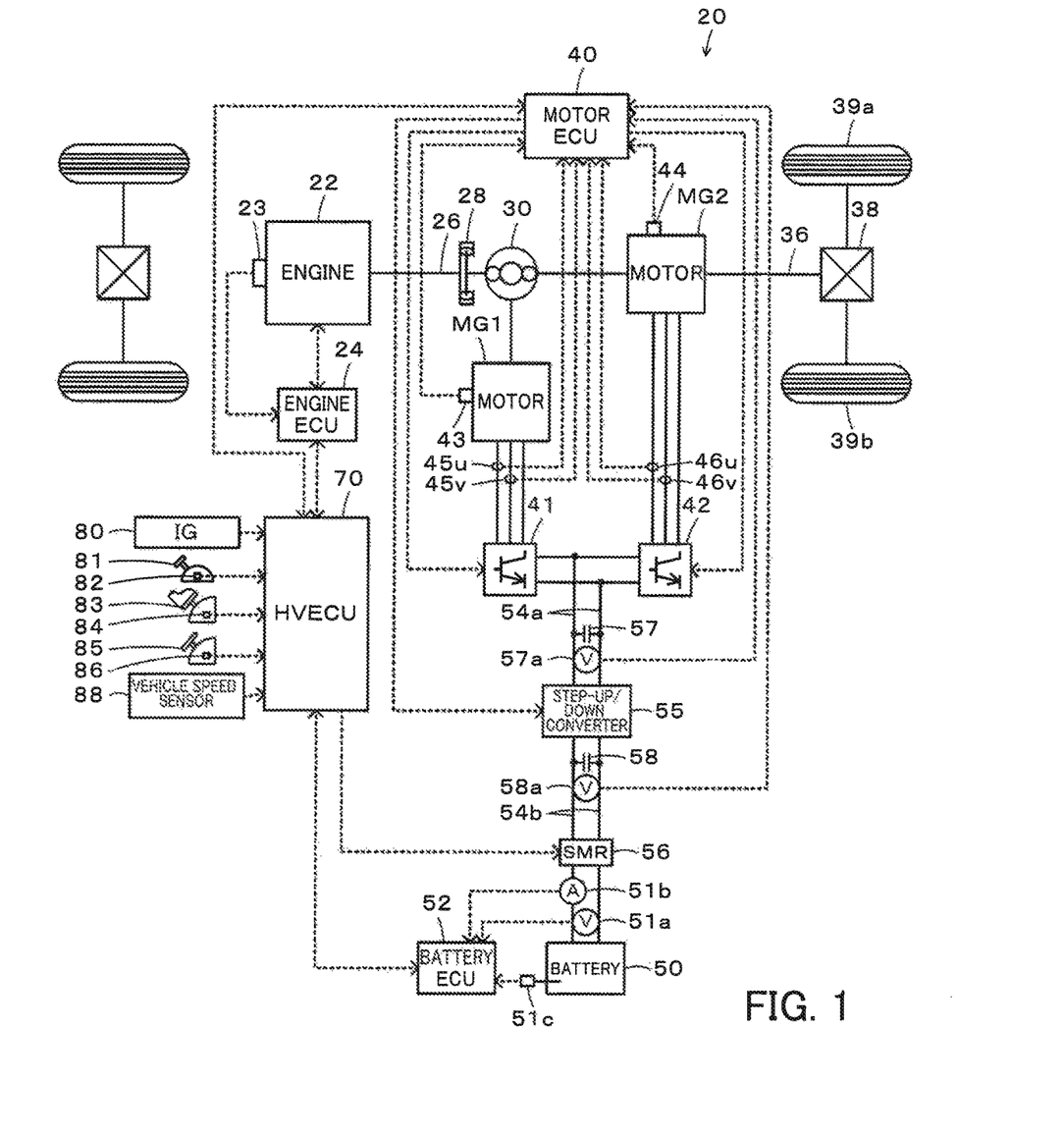
FIG. 1 is a configuration diagram illustrating the schematic configuration of a hybrid vehicle according to one embodiment.
Figure 2:
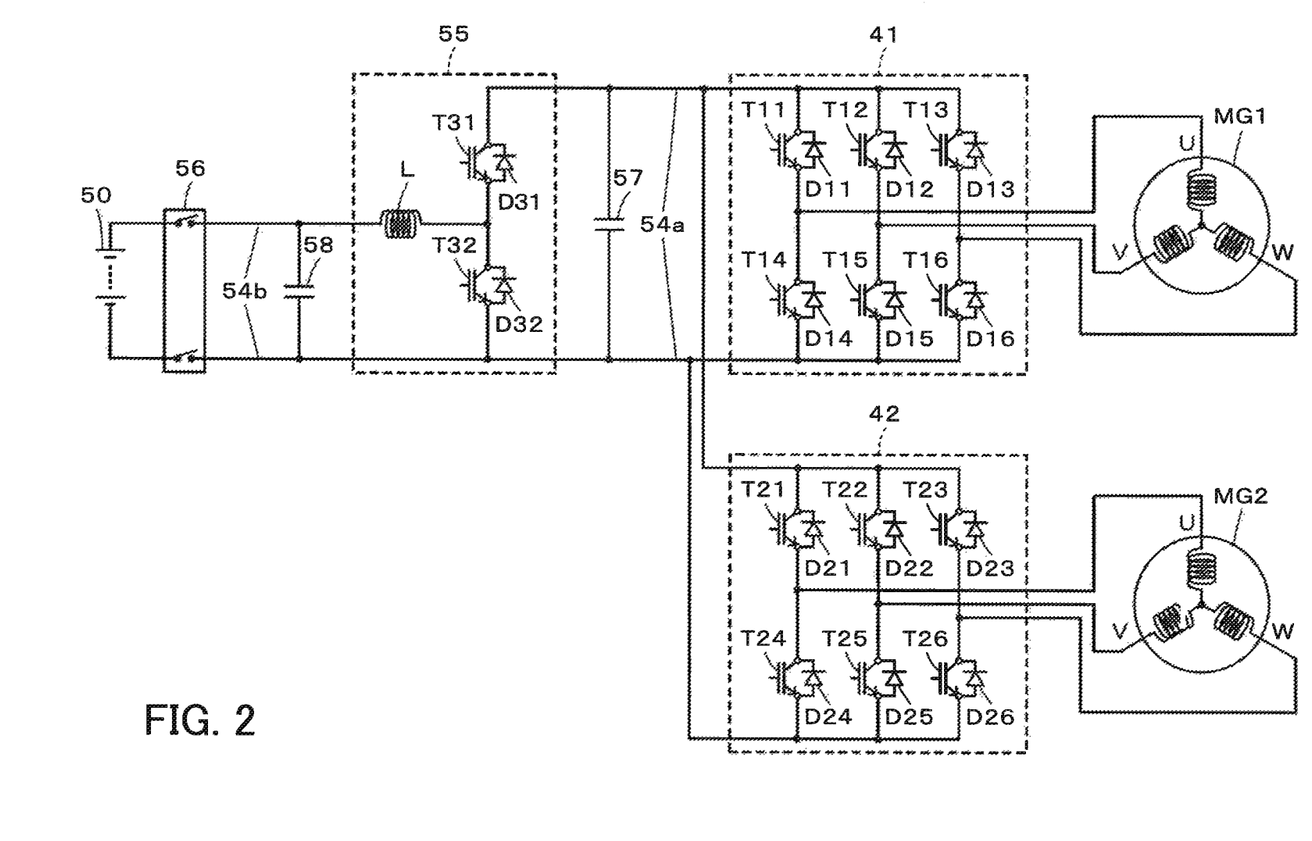
FIG. 2 is a configuration diagram illustrating the schematic configuration of an electric drive system including motors.

FIG. 1 is a configuration diagram illustrating the schematic configuration of a hybrid vehicle 20 according to one embodiment, and FIG. 2 is a configuration diagram illustrating the schematic configuration of an electric drive system including motors MG1 and MG2. As illustrated, the hybrid vehicle 20 of the embodiment includes an engine 22, a planetary gear 30, motors MG1 and MG2, inverters 41 and 42, a step-up/down converter 55, a battery 50 as a power storage device, a system main relay 56, and a hybrid electronic control unit (hereinafter referred as "HVECU") 70.

The engine 22 is configured as an internal combustion engine that output power using, for example, gasoline or light oil as fuel. This engine 22 is operated and controlled by an engine electronic control unit (hereinafter referred to as engine ECU) 24.

The engine ECU 24 is implemented by a CPU-based microprocessor and includes a ROM that stores processing programs, a RAM that temporarily stores data, input and output ports and a communication port other than the CPU, although not being illustrated. The engine ECU 24 inputs, via its input port, signals from various sensors required for operation control of the engine 22, for example, a crank position θcr from a crank position sensor 23 configured to detect the rotational position of a crankshaft 26. The engine ECU 24 outputs, via its output port, various control signals for operation control of the engine 22. The engine ECU 24 is connected with the HVECU 70 via their communication ports. The engine ECU 24 computes a rotation speed Ne of the engine 22, based on the crank position θcr detected by the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 39a and 39b via a differential gear 38. The planetary gear 30 also includes a carrier that is connected with the crankshaft 26 of the engine 22.

The motor MG1 is configured as a synchronous generator motor including a rotor with permanent magnets embedded therein and a stator with three-phase coils wound thereon. As described above, the rotor is connected with the sun gear of the planetary gear 30. The motor MG2 is also configured as a synchronous generator motor like the motor MG1 and includes a rotor that is connected with the driveshaft 36.

The inverters 41 and 42 are used to drive the motors MG1 and MG2. As shown in FIG. 2, the inverter 41 is connected with high voltage-side power lines 54a and includes six transistors T11 to T16 and six diodes D11 to D16 that are respectively connected in parallel to the six transistors T11 to T16. The transistors T11 to T16 are arranged in pairs, such that two transistors in each pair respectively serve as a source and a sink relative to a positive electrode line and a negative electrode line of the high voltage-side power lines 54a. The respective phases of the three-phase coils (U phase, V phase and W phase) of the motor MG1 are connected with connection points of the respective pairs of the transistors T11 to T16. Accordingly, when a voltage is applied to the inverter 41, a motor electronic control unit (hereinafter referred to as "motor ECU") 40 regulates the rates of ON times of the respective pairs of the transistors T11 to T16 to provide a rotating magnetic field in the three-phase coils and thereby rotate and drive the motor MG1, Like the inverter 41, the inverter 42 is also connected with the high voltage-side power lines 54a and includes six transistors T21 to T26 and six diodes D21 to D26. When a voltage is applied to the inverter 42, the motor ECU 40 regulates the rates of ON times of the respective pairs of the transistors T21 to T26 to provide a rotating magnetic field in the three-phase coils and thereby rotate and drive the motor MG2.

The step-up/down converter 55 is connected with the high voltage-side power lines 54a and with low voltage-side power lines 54b and includes two transistors T31 and T32, two diodes D31 and D32 respectively connected in parallel to the two transistors T31 and T32, and a reactor L. The transistor T31 is connected with the positive electrode line of the high voltage-side power lines 54a. The transistor T32 is connected with the transistor T31 and with negative electrode lines of the high voltage-side power lines 54a and of the low voltage-side power lines 54b. The reactor L is connected with a connection point between the transistors T31 and T32 and with a positive electrode line of the low voltage-side power lines 54b. The motor ECU 40 regulates the rates of ON times of the transistors T31 and T32, such that the step-up/down converter 55 steps up an electric power of the low voltage-side power lines 54b and supplies the stepped-up electric power to the high voltage-side power lines 54a, while stepping down an electric power of the high voltage-side power lines 54a and supplying the stepped-down electric power to the low voltage-side power lines 54b. A smoothing capacitor 57 is mounted to the positive electrode line and the negative electrode line of the high voltage-side power lines 54a. A smoothing capacitor 58 is mounted to the positive electrode line and the negative electrode line of the low voltage-side power lines 54b.

The motor ECU 40 is configured as a CPU-based microprocessor and includes a ROM configured to store processing programs, a RAM configured to temporarily store data, input/output ports and a communication port, in addition to the CPU, although not being illustrated. As shown in FIG. 1, signals from various sensors required for drive control of the motors MG1 and MG2 and the step-up/down converter 55 are input into the motor ECU 40 via the input port. The signals input into the motor ECU 40 include, for example, rotational positions θm1 and θm2 from rotational position detection sensors 43 and 44 configured to detect the rotational positions of the respective rotors of the motors MG1 and MG2 and phase currents Iu1, Iv1, Iu2 and Iv2 from current sensors 45u, 45v, 46u and 46v configured to detect electric currents flowing in the respective phases of the motors MG1 and MG2. The input signals also include a voltage (high voltage-side voltage) VH of the capacitor 57 (high voltage-side power lines 54a) from a voltage sensor 57a mounted between terminals of the capacitor 57 and a voltage (low voltage-side voltage) VL of the capacitor 58 (low voltage-side power lines 54b) from a voltage sensor 58a mounted between terminals of the capacitor 58. Various control signals for drive control of the motors MG1 and MG2 and the step-up/down converter 55 are output from the motor ECU 40 via the output port. The signals output from the motor ECU 40 include, for example, switching control signals to the transistors T11 to T16 of the inverter 41 and the transistors T21 to T26 of the inverter 42 and switching control signals to the transistors T31 and T32 of the step-up/down converter 55. The motor ECU 40 is connected with the HVECU 70 via the respective communication ports. The motor ECU 40 calculates electrical angles θe1 and θe2, angular velocities ωm1 and ωm2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery having a rated voltage of, for example, 250 V, 280V or 300 V and is connected with the low voltage-side power lines 54b. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50. The battery ECU 52 is connected with the HVECU 70 via the respective communication ports. The battery ECU 52 calculates a state of charge SCC, based on an integrated value of the battery current Ib input from the current sensor 51b. The state of charge SOC denotes a ratio of the capacity of electric power dischargeable from the battery 50 to the overall capacity of the battery 50.

The system main relay 56 is provided on the battery 50-side of the capacitor 58 in the low voltage-side power lines 54b. This system main relay 56 is controlled on and off by the HVECU 70 to connect and disconnect the battery 50 with and from the step-up/down converter 55-side.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 obtains signals input from various sensors via the input port. The signals input into the HVECU 70 include, for example, an ignition signal from an ignition switch 80 and a shift position SP from a shift position sensor 82 configured to detect an operating position of a shift lever 81. The input signals further include, for example, an accelerator position Acc from an accelerator pedal position sensor 84 configured to detect a depression amount of an accelerator pedal 83, a brake pedal position BP from a brake pedal position sensor 85 configured to detect a depression amount of a brake pedal 85, and a vehicle speed V from a vehicle speed sensor 88. The shift position SP includes, for example, a parking position (P position), a reverse drive position (R position) a neutral position (N position) and a drive position (D position) and so on. The HVECU 70 is connected with the engine ECU 24, the motor ECU 40, and the battery ECU 52 via the respective communication ports as described above.

The hybrid vehicle 20 of the embodiment having the above configuration runs in a hybrid drive mode (HV drive mode) driven with operation of the engine 22 and in an electric drive mode (EV drive mode) driven with stop of operation of the engine 22.

In the HV drive mode, the HVECU 70 sets a required torque Td* that is required for the driveshaft 36, based on the accelerator position Acc and the vehicle speed V, and calculates a required power Pd* that is required for the driveshaft 36 by multiplying the set required torque Td* by a rotation speed Nd of the driveshaft 36 (rotation speed Nm2 of the motor MG2). The HVECU 70 subsequently sets a required power Pe* that is required for the engine 22 by subtracting a required charge-discharge power Pb* of the battery 50 (which takes a positive value when the battery 50 is discharged) based on the state of charge SOC of the battery 50 from the required power Pd*. The HVECU 70 subsequently sets a target rotation speed Ne* and a target torque Te* of the engine 22 and torque commands Tm1* and Tm2* of the motors MG1 and MG2, such that the required power Pe* is output from the engine 22 and that the required torque Td* is output to the driveshaft 36. The HVECU 70 then respectively sets predetermined voltages VHcmax1 and VHcmin1 to upper and lower limit control voltages VHcmax and VHcmin of the high voltage-side power lines 54a and sets a target voltage VH* of the high voltage-side power lines 54a to increase with increases in absolute values of the torque commands Tm1* and Tm2* and in absolute values of the rotation speeds Nm1 and Nm2 of the motors MG1 and MG2 in the range of the lower limit control voltage VHcmin to the upper limit control voltage VHCmax. The predetermined voltages VHcmax1 and the VHcmin1 will be described later. The HVECU 70 then sends the target rotation speed Ne* and the target torque Te* of the engine 22 to the engine ECU 24, while sending the torque commands Tm1* and Tm2* of the motors MG1 and MG2 and the target voltage VH* of the high voltage-side power lines 54a to the motor ECU 40. The engine ECU 24 performs, for example, intake air flow control, fuel injection control and ignition control of the engine 22 to operate the engine 22 with the target rotation speed Ne* and the target torque Te*. The motor ECU 40 performs switching control of the transistors T11 to T16 of the inverter 41 and the transistors T21 to T26 of the inverter 42 to drive the motors MG1 and MG2 with the torque commands Tm1* and Tm2*, while performing switching control of the transistors T31 and T32 of the step-up/down converter 55 to make the voltage VH of the high voltage-side power lines 54a equal to the target voltage VH*.

The following describes the predetermined voltages VHcmax1 and VHcmin1. The predetermined voltage VHcmax1 used is a voltage lower than an allowable upper limit voltage VHpmax by several V to several tens V. The predetermined voltage VHcmin1 used is a voltage higher than an allowable lower limit voltage VHpmin by several V to several tens V. The allowable upper limit voltage VHpmax denotes an upper limit in a range of the voltage VH that is suitable for controlling the step-up/down converter 55 (i.e., appropriately regulating the voltage VH of the high voltage-side power lines 54a). The allowable upper limit voltage VHpmax used may be, for example, the smaller between a value (VL/DLo) by dividing the voltage VL of the low voltage-side power lines 54b by a lower limit duty Dlo that denotes a lower limit in a range of a duty (voltage VL of the low voltage-side power lines 54b/target voltage VH* of high voltage-side power lines 54a) that ensures the controllability of the transistors T31 and T32 by taking into account a dead time and the like, and a component protecting voltage that is determined by taking into account the withstand voltages of the respective elements of the step-up/down converter 55, a surge voltage accompanied with switching of the transistors T31 and T32 and the like. The allowable lower limit voltage VHpmin denotes a lower limit in the range of the voltage VH that is suitable for controlling the step-up/down converter 55 (i.e. appropriately regulating the voltage VH of the high voltage-side power lines 54a). The allowable lower limit voltage VHpmin used may be, for example, a value (VL/DHi) ray dividing the voltage VL of the low voltage-side power lines 54b by an upper limit duty Dhi that denotes an upper limit in the range of the duty that ensures the controllability of the transistors T31 and T32 by taking into account the dead time and the like.

In the EV drive mode, the HVECU 70 sets the required torque Td*, based on the accelerator position Acc and the vehicle speed V, and sets a value 0 to the torque command Tm1* of the motor MG1. The HVECU 70 also sets the torque command Tm2* of the motor MG2 such that the required torque Td* is output to the driveshaft 36. As in the HV drive mode, the HVECU 70 subsequently sets the upper limit control voltage VHcmax, the lower limit control voltage VHcmin and the target voltage VH* of the high voltage-side power lines 54a. The HVECU 70 then sends the torque commands Tm1* and Tm2* of the motors MG1 and MG2 and the target voltage VH* of the high voltage-side power lines 54a to the motor ECU 40. The motor ECU 40 controls the inverters 41 and 42 and the step-up/down converter 55 as described above.

Figure 3:
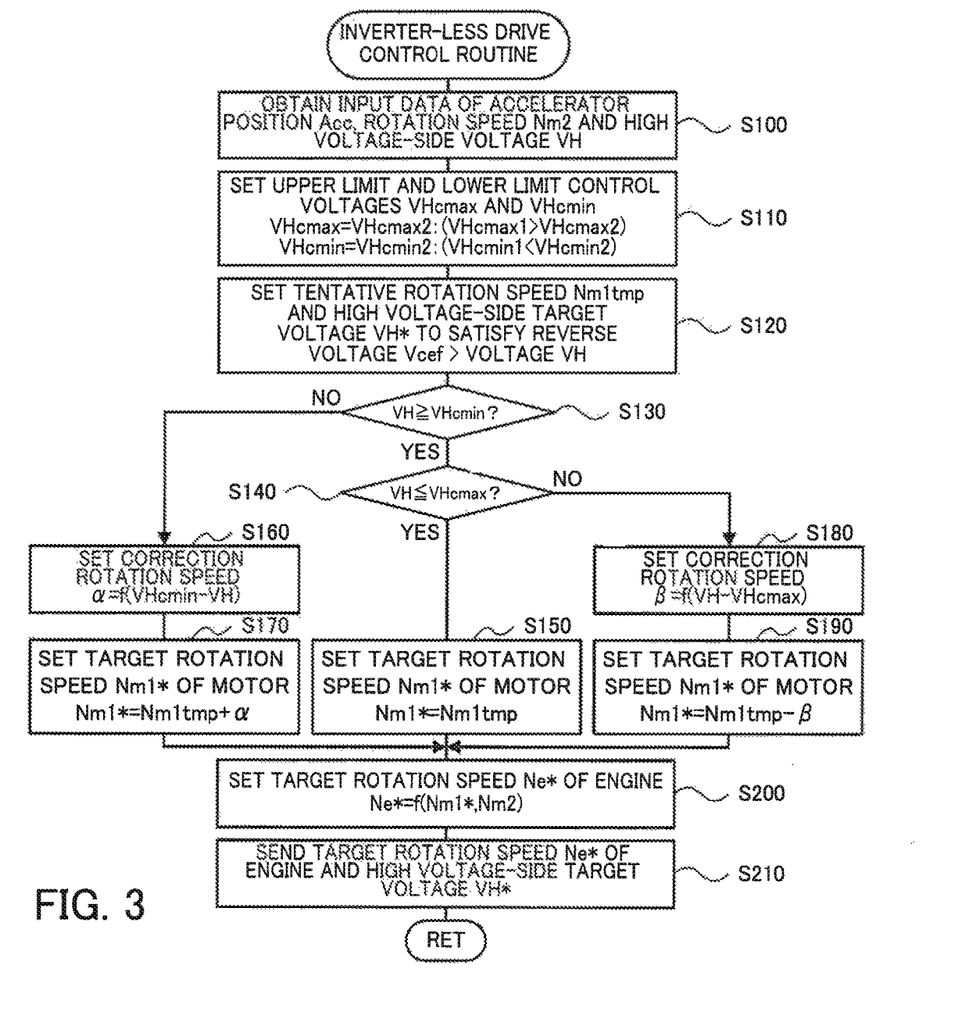
FIG. 3 is a flowchart showing one example of an inverter-less drive control routine performed by the HVECU according to the embodiment.

The following describes operations of the hybrid vehicle 20 of the embodiment having the above configuration and more specifically series of operations in inverter-less drive (emergency drive) that causes the hybrid vehicle 20 to be driven with operation of the engine 22 in the shutdown state of the inverters 41 and 42 (i.e., in the state that all the transistors T11 to T16 and T21 to T26 are turned off). The inverter-less drive is performed in the event of an abnormality of the inverters 41 and 42 or in the event of an abnormality of the sensors used for control of the inverters 41 and 42 (for example, rotational position detection sensors 43 and 44) during a run in the HV drive mode. FIG. 3 is a flowchart showing one example of an inverter-less drive control routine performed by the HVECU 70 according to the embodiment. This routine is performed repeatedly during the inverter-less drive.

When the inverter-less drive control routine is triggered, the HVECU 70 first obtains input data, i.e. the accelerator position Acc, the rotation speed Nm2 of the motor MG2 and the voltage VH of the high voltage-side power lines 54a (step S100). The accelerator position Acc is input as a value detected by the accelerator pedal position sensor 84. The rotation speed Nm2 of the motor MG2 is a value that is calculated based on the rotational position θm2 of the rotor of the motor MG2 detected by the rotational position detection sensor 44 and is input from the motor ECU 40 by communication. The voltage VH of the high voltage-side power lines 54a is a value that is detected by the voltage sensor 57a and is input from the motor ECU 40 by communication.

The HVECU 70 subsequently sets a predetermined voltage VHcmax2 that is lower than the predetermined voltage VHcmax1 described above, to the upper limit control voltage VHcmax of the high voltage-side power lines 54a and sets a predetermined voltage VHcmin2 that is higher than the predetermined voltage VHcmin1 described above, to the lower limit control voltage VHcmin of the high voltage-side power lines 54a (step S110). The predetermined voltage VHcmax2 used may be, for example, a voltage lower than the predetermined voltage VHcmax1 by several V to several tens V. The predetermined voltage VHcmin2 used may be, for example, a voltage higher than the predetermined voltage VHcmin1 by several V to several tens V.

The HVECU 70 then sets a tentative rotation speed Nm1tmp that is a tentative value of the target rotation speed Nm1* of the motor MG1, and the target voltage VH* of the high voltage-side power lines 54a, such that a reverse voltage Vcef generated during rotation of the motor MG1 becomes higher than the voltage VH of the high voltage-side power lines 54a (step S120). The reverse voltage Vcef of the motor MG1 is equivalent to a product of the angular velocity ωm1 of the motor MG1 and a reverse voltage constant Ke.

Figure 4:
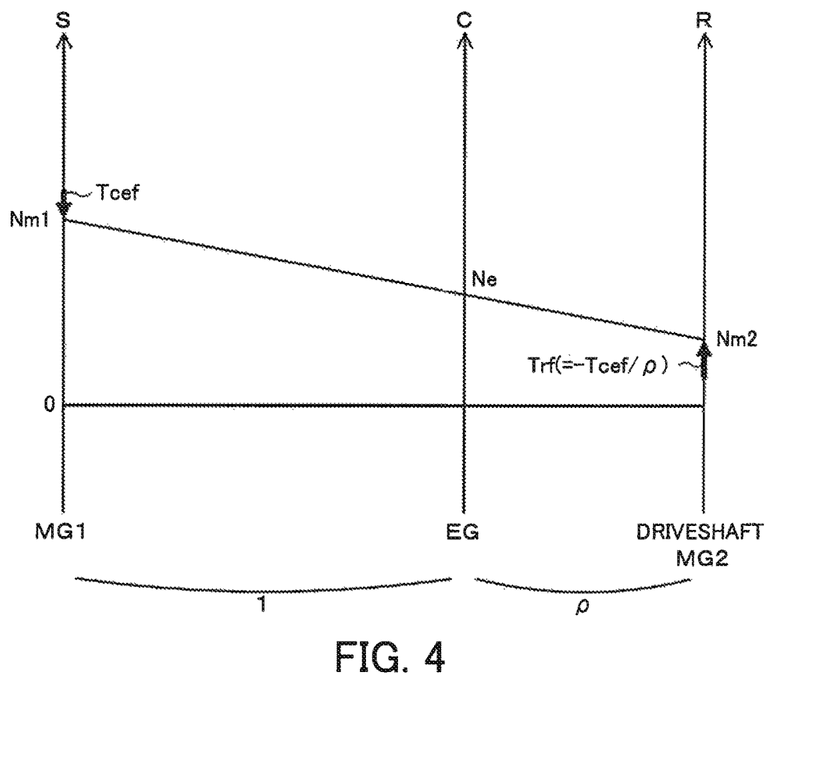
FIG. 4 is a diagram illustrating one example of an alignment chart of the planetary gear when the reverse voltage of the motor is higher than the voltage of the high voltage-side power lines in the inverter-less drive.

FIG. 4 is a diagram illustrating one example of an alignment chart of the planetary gear 30 when the reverse voltage Vcef of the motor MG1 is higher than the voltage VH of the high voltage-side power lines 54a in the inverter-less drive. In FIG. 4, an S axis on the left side shows the rotation speed of the sun gear of the planetary gear 30 that is equal to the rotation speed Nm1 of the motor MG1. A C axis shows the rotation speed of the carrier of the planetary gear 30 that is equal to the rotation speed Ne of the engine 22. An axis R shows the rotation speed of the ring gear of the planetary gear 30 that is equal to the rotation speed Nm2 of the motor MG2 (and equal to the rotation speed Nd of the driveshaft 36) In FIG. 4, "ρ" denotes a gear ratio of the planetary gear 30 (number of teeth of sun gear/number of teeth of ring gear). When the reverse voltage Vcef of the motor MG1 is higher than the voltage VH of the high voltage-side power lines 54a, as illustrated, a regenerative torque Tcef is generated in the motor MG1 based on a voltage difference (Vcef−VH) between the reverse voltage Vcef of the motor MG1 and the voltage VH of the high voltage-side power lines 54a, and a driving torque (reactive torque) Trf(=−Tcef/ρ) based oh this regenerative torque Tcef is output to the driveshaft 36. More specifically, the regenerative torque Tcef is generated when the motor MG1 is driven with operation of the engine 22 and an electric power based on the reverse voltage Vcef of the motor MG1 is rectified by the diodes D11 to D16 of the inverter 41 and is supplied to the battery 50 via the high voltage-side power lines 54a, the step-up/down converter 55 and the low voltage-side power lines 54b.

Figure 5:
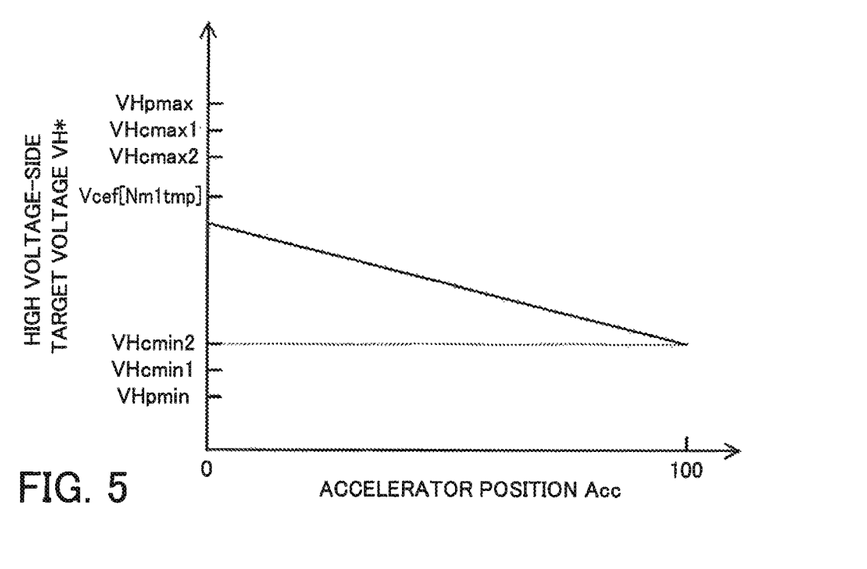
FIG. 5 is one example of a relationship between the accelerator position and the target voltage of the high voltage-side power lines.

The process of step S120 described above sets the tentative rotation speed Nm1tmp of the motor MG1 and the target voltage VH* of the high voltage-side power lines 54a, such that the driving torque Trf is output to the driveshaft 36. The tentative rotation speed Nm1tmp of the motor MG1 may be set to, for example, a rotation speed (fixed value) of approximately 4000 rpm to 6000 rpm. The target voltage VH* of the high voltage-side power lines 54a is set based on the accelerator position Acc in a range of the lower limit control voltage VHcmin (=VHcmin2) to the upper limit control voltage VHcmax (=VHcmax2) and in a range of not higher than the reverse voltage Vcef when the motor MG1 is rotated at the tentative rotation speed Nm1tmp. One example of a relationship between the accelerator position Acc and the target voltage VH* of the high voltage-side power lines 54a is shown in FIG. 5. In FIG. 5, "Vcef [Nm1tmp]" denotes the reverse voltage Vcef when the motor MG1 is rotated at the tentative rotation speed Nm1tmp. As illustrated, the target voltage VH* of the high voltage-side power lines 54a is set to give a lower value at the higher accelerator position Acc than a value at the lower accelerator position or more specifically to decrease with an increase in the accelerator position Acc. This increases the voltage difference (Vcef−VH) with an increase in the accelerator position Acc and thereby increases the driving torque Trf.

The HVECU 70 subsequently compares the voltage VH of the high voltage-side power lines 54a with the lower limit control voltage VHcmin and with the upper limit control voltage VHcmax (steps S130 and S140). When the voltage VH of the high voltage-side power lines 54a is not lower than the lower limit control voltage VHcmin and not higher than the upper limit control voltage VHcmax, the HVECU 70 sets the tentative rotation speed Nm1tmp to the target rotation speed Nm1* of the motor MG1 (step S150) and calculates the target rotation speed Ne* of the engine 22 from the target rotation speed Nm1* of the motor MG1, the rotation speed Nm2 of the motor MG2 (rotation speed Nd of the driveshaft 36) and the gear ratio ρ of the planetary gear 30 according to Equation (1) given below (step S200). The HVECU 70 then sends the target rotation speed Ne* of the engine 22 to the engine ECU 24, while sending the target voltage VH* of the high voltage-side power lines 54a to the motor ECU 40 (step S210) and terminates this routine. Equation (1) is readily derived by using FIG. 4. When receiving the target rotation speed Ne* of the engine 22, the engine ECU 24 performs intake air flow control, fuel injection control and ignition control of the engine 22 to make the rotation speed Ne of the engine 22 equal to the target rotation speed Ne*. This control causes the driving torque Trf to be output to the driveshaft 36 and thereby causes the hybrid vehicle 20 to be driven.

$$Ne^* = (Nm1^* \cdot \rho + Nm2)/(1+\rho) \quad (1)$$

The following describes a reason why the predetermined voltages VHcmax2 (<VHcmax1) and VHcmin2 (>VHcmin1) are set to the upper limit control voltage VHcmax and the lower limit control voltage VHcmin of the high voltage-side power lines 54a in the inverter-less drive. The inverters 41 and 42 are in the gate shutdown state during the inverter-less drive. Accordingly, the inverter-less drive is likely to have a greater variation in voltage VH of the high voltage-side power lines 54a, compared with an ordinary drive (drive in the HV drive mode or in the EV drive mode), i.e., a drive in the state that the motors MG1 and MG2 are driven by the inverters 41 and 42. When the predetermined voltages VHcmax1 and VHcmin1 that are set during the ordinary drive are set to the upper limit control voltage VHcmax and the lower limit control voltage VHcmin of the high voltage-side power lines 54a during the inverter-less drive, the voltage VH of the high voltage-side power lines 54a is likely to become lower than the allowable lower limit voltage VHpmin or to become higher than the allowable upper limit voltage VHpmax. This is likely to cause a failure in appropriately regulating the voltage VH of the high voltage-side power lines 54a and is thus likely to increase a variation in the driving torque Trf. According to this embodiment, on the basis of the foregoing, the predetermined voltages VHcmax2 and VHcmin2 are set to the upper limit control voltage VHcmax and the lower limit control voltage VHcmin of the high voltage-side power lines 54a in the inverter-less drive. This suppresses the voltage VH of the high voltage-side power lines 54a from becoming lower than the allowable lower limit voltage VHpmin or becoming higher than the allowable upper limit voltage VHpmax. As a result, this reduces a failure in appropriately regulating the voltage VH of the high voltage-side power lines 54a and reduces an increase in variation of the driving torque Trf.

As described above, the inverter-less drive is likely to have a greater variation in voltage VH of the high voltage-side power lines 54a, compared with the ordinary drive. Even when the step-up/down converter 55 is controlled with setting of the target voltage VH* of the high voltage-side power lines 54a in the range of the lower limit control voltage VHcmin to the upper limit control voltage VHcmax, the voltage VH of the high voltage-side power lines 54a may become lower than the lower limit control voltage VHcmin or become higher than the upper limit control Voltage VHcmax.

Figure 6:
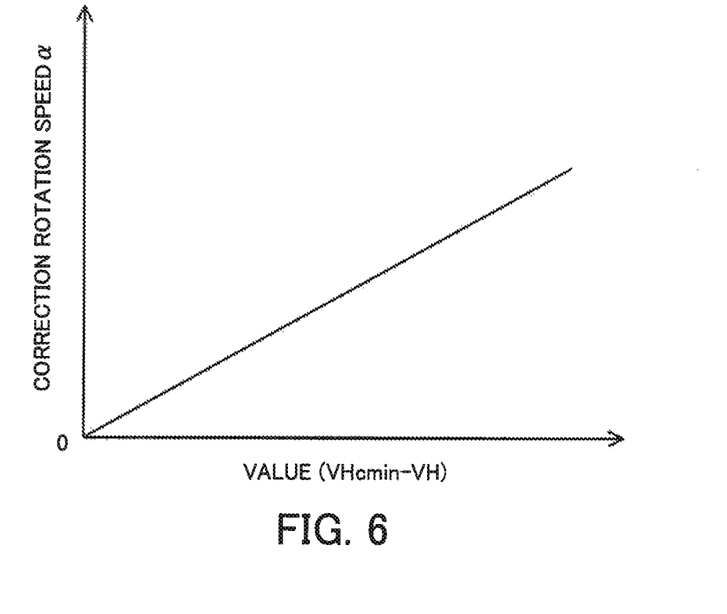
FIG. 6 is one example of a relationship between the value (VHcmin−VH) and the correction rotation speed.

When the voltage VH of the high voltage-side power lines 54a is lower than the lower limit control voltage VHcmin at step S130, the HVECU 70 sets a correction rotation speed α in a positive range based on a value (VHcmin−VH) obtained by subtracting the voltage VH from the lower limit control voltage VHcmin (step S160) and sets a value (Nm1tmp+α) obtained by adding the correction rotation speed α to the tentative rotation speed Nm1tmp of the motor MG1, to the target rotation speed Nm1* of the motor MG1 (step S170). The HVECU 70 subsequently calculates the target rotation speed Ne* of the engine 22 according to Equation (1) given above (step S200). The HVECU 70 then sends the target rotation speed Ne* of the engine 22 to the engine ECU 24, while sending the target voltage VH* of the high voltage-side power lines 54a to the motor ECU 40 (step S210) and terminates this routine. One example of a relationship between the value (VHcmin−VH) and the correction rotation speed α is shown in FIG. 6. As illustrated, the correction rotation speed α is set to give a higher value at the higher value (VHcmin−VH) than a value at the lower value (VHcmin−VH) or more specifically to increase with an increase in the value (VHcmin−VH).

When the voltage VH of the high voltage-side power lines 54a is lower than the lower limit control voltage VHcmin, further decreasing the voltage VH of the high voltage-side power lines 54a is not preferable since it is likely to cause the voltage VH of the high voltage-side power lines 54a to be lower than the allowable lower limit voltage VHpmin. By taking into account that the driving torque Trf is based on the voltage difference (Vcef−VH), the procedure of the embodiment increases the target rotation speed Nm1* of the motor MG1 to increase the reverse voltage Vcef, instead of decreasing the voltage VH of the high voltage-side power lines 54a. This increases the driving torque Trf, while suppressing a further decrease in the voltage VH of the high voltage-side power lines 54a accompanied with charging of the capacitor 57. This increases the target rotation speed Nm1* of the motor MG1 with an increase in the value (VHcmin−VH), i.e., with a decrease in the voltage VH of the high voltage-side power lines 54a relative to the lower limit control voltage VHcmin. This configuration more appropriately increases the driving torque Trf, while more appropriately suppressing a further decrease in the voltage VH of the high voltage-side power lines 54a.

Figure 7:
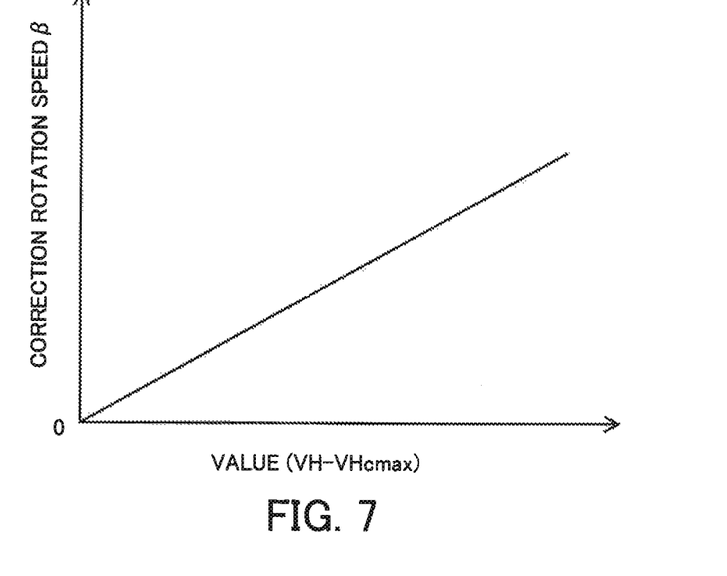
FIG. 7 is one example of a relationship between the value (VH−VHcmax) and the correction rotation speed.

When the voltage VH of the high voltage-side power lines 54a is higher than the upper limit control voltage VHcmax at step S140, the HVECU 70 sets a correction rotation speed β in a positive range based on a value (VH−VHcmax) obtained by subtracting the upper limit control voltage VHcmax from the voltage VH (step S180) and sets a value (Nm1tmp−β) obtained by subtracting the correction rotation speed β from the tentative rotation speed Nm1tmp of the motor MG1, to the target rotation speed Nm1* of the motor MG1 (step S190). The HVECU 70 subsequently calculates the target rotation speed Ne* of the engine 22 according to Equation (1) given above (step S200). The HVECU 70 then sends the target rotation speed Ne* of the engine 22 to the engine ECU 24, while sending the target voltage VH* of the high voltage-side power lines 54a to the motor ECU 40 (step S210) and terminates this routine. One example of a relationship between the value (VH−VHcmax) and the correction rotation speed β is shown in FIG. 7. As illustrated, the correction rotation speed β is set to give a higher value at the higher value (VH−VHcmax) than a value at the lower value (VH−VHcmax) or more specifically to increase with an increase in the value (VH−VHcmax).

When the voltage VH of the high voltage-side power lines 54a is higher than the upper limit control voltage VHcmax, further increasing the voltage VH of the high voltage-side power lines 54a is not preferable since it is likely to cause the voltage VH of the high voltage-side power lines 54a to be higher than the allowable upper limit voltage VHpmax. By taking into account that the driving torque Trf is based on the voltage difference (Vcef−VH), the procedure of the embodiment decreases the target rotation speed Nm1* of the motor MG1 to decrease the reverse voltage Vcef, instead of increasing the voltage VH of the high voltage-side power lines 54a. This decreases the driving torque Trf, while suppressing a further increase in the voltage VH of the high voltage-side power lines 54a. This decreases the target rotation speed Nm1* of the motor MG1 with an increase in the value (VH−VHcmax), i.e., with an increase in the voltage VH of the high voltage-side power lines 54a relative to the upper limit control voltage VHcmax. This configuration more appropriately decreases the driving torque Trf, while more appropriately suppressing a further increase in the voltage VH of the high voltage-side power lines 54a.

The hybrid vehicle 20 of the embodiment described above increases the lower limit control voltage VHcmin and decreases the upper limit control voltage VHcmax during the inverter-less drive, compared with during the ordinary drive (drive in the HV drive mode or in the EV drive mode). This configuration suppresses the voltage VH of the high voltage-side power lines 54a from becoming lower than the allowable lower limit voltage VHpmin or becoming higher than the allowable upper limit voltage VHpmax, compared with a configuration that sets the same values as those during the ordinary drive to the upper limit control voltage VHcmax and the lower limit control voltage VHcmin during the inverter-less drive. As a result, this reduces a failure in appropriately regulating the voltage VH of the high voltage-side power lines 54a and reduces an increase in variation of the driving torque Trf.

The hybrid vehicle 20 of the embodiment increases the lower limit control voltage VHcmin and decreases the upper limit control voltage VHcmax during the inverter-less drive, compared with during the ordinary drive. A modification may set the same value as that during the ordinary drive to the upper limit control voltage VHcmax during the inverter-less drive, while increasing the lower limit control voltage VHcmin.

When the voltage VH of the high voltage-side power lines 54a is lower than the lower limit control voltage VHcmin during the inverter-less drive, the hybrid vehicle 20 of the embodiment sets the correction rotation speed α based on the value (VHcmin−VH) obtained by subtracting the voltage VH from the lower limit control voltage VHcmin and sets the value (Nm1tmp+α) obtained by adding the set correction rotation speed α to the tentative rotation speed Nm1tmp of the motor MG1, to the target rotation speed Nm1* of the motor MG1. When the voltage VH of the high voltage-side power lines 54a is lower than the lower limit control voltage VHcmin during the inverter-less drive, a modification may set a value obtained by adding a fixed correction rotation speed α irrespective of the value (VHcmin−VH) to the tentative rotation speed Nm1tmp of the motor MG1, to the target rotation speed Nm1* of the motor MG1.

When the voltage VH of the high voltage-side power lines 54a is lower than the lower limit control voltage VHcmin during the inverter-less drive, the hybrid vehicle 20 of the embodiment sets the value (Nm1tmp+α) obtained by adding the positive correction rotation speed α to the tentative rotation speed Nm1tmp of the motor MG1, to the target rotation speed Nm1* of the motor MG1. Even when the voltage VH of the high voltage-side power lines 54a is lower than the lower limit control voltage VHcmin during the inverter-less drive, however, a modification may set the tentative rotation speed Nm1tmp of the motor MG1 to the target rotation speed Nm1* of the motor MG1.

When the voltage VH of the high voltage-side power lines 54a is higher than the upper limit control voltage VHcmax during the inverter-less drive, the hybrid vehicle 20 of the embodiment sets the correction rotation speed β based on the value (VH−VHcmax) obtained by subtracting the upper limit control voltage VHcmax from the voltage VH and sets the value (Nm1tmp−β) obtained by subtracting the set correction rotation speed β from the tentative rotation speed Nm1tmp of the motor MG1, to the target rotation speed Nm1* of the motor MG1. When the voltage VH of the high voltage-side power lines 54a is higher than the upper limit control voltage VHcmax during the inverter-less drive, a modification may set a value obtained by subtracting a fixed correction rotation speed β irrespective of the value (VH−VHcmax) from the tentative rotation speed Nm1tmp of the motor MG1, to the target rotation speed Nm1* of the motor MG1.

When the voltage VH of the high voltage-side power lines 54a is higher than the upper limit control voltage VHcmax during the inverter-less drive, the hybrid vehicle 20 of the embodiment sets the value (Nm1tmp−β) obtained by subtracting the positive correction rotation speed β from the tentative rotation speed Nm1tmp of the motor MG1, to the target rotation speed Nm1* of the motor MG1. Even when the voltage VH of the high voltage-side power lines 54a is higher than the upper limit control voltage VHcmax during the inverter-less drive, however, a modification may set the tentative rotation speed Nm1tmp of the motor MG1 to the target rotation speed Nm1* of the motor MG1.

The hybrid vehicle 20 of the embodiment performs the inverter-less drive in the event of an abnormality of the inverters 41 and 42 or in the event of an abnormality of the sensors used for control of the inverters 41 and 42 during the drive in the HV drive mode. In a configuration that the accelerator position Acc from the accelerator pedal position sensor 84 is input into the motor ECU 40 as well as into the HVECU 70, the inverter-less drive may additionally be performed in the event of a communication failure between the HVECU 70 and the motor ECU 40 during the drive in the NV drive mode. In this case, the motor ECU 40 fails to receive the target voltage VH* of the high voltage-side power lines 54a from the HVECU 70. Accordingly, the motor ECU 40 may set the target voltage VH* of the high voltage-side power lines 54a based on the accelerator position Acc from the accelerator pedal position sensor 84 and control the step-up/down converter 55.

The hybrid vehicle 20 of the embodiment uses the battery 50 as the electrical storage device, but a capacitor may be used as the electrical storage device.

The hybrid vehicle 20 of the embodiment is configured to include the engine ECU 24, the motor ECU 40, the battery ECU 52, and HVECU 70, but at least part of these ECUs may be configured as a single electronic control unit.

In the hybrid vehicle of this aspect, the control device may control the step-up/down converter, such as to give a lower value of the voltage of the high voltage-side power line at a higher operation amount of an accelerator than a value at a lower operation amount of the accelerator during the predetermined drive. This configuration gives a larger voltage difference between the reverse voltage of the first motor and the voltage of the high voltage-side power line at a larger operation amount of an accelerator, compared with a voltage difference at a smaller operation amount of the accelerator. This accordingly increases the regenerative torque of the first motor and thereby increases the driving torque.

Further, in the hybrid vehicle of this aspect, when the voltage of the high voltage-side power line becomes lower than the lower limit control voltage during the predetermined drive, the control device may control the engine, such as to rotate the first motor at a higher rotation speed than a rotation speed when the voltage of the high voltage-side power line is not lower than the lower limit control voltage. When the voltage of the high voltage-side power line becomes lower than the lower limit control voltage, this configuration increases the reverse voltage of the first motor. This accordingly increases the driving torque, while suppressing a further decrease in voltage of the high voltage-side power line.

In this case, when the voltage of the high voltage-side power line becomes lower than the lower limit control voltage during the predetermined drive, the control device may control the engine, such as to rotate the first motor at a rotation speed that increases with a decrease in voltage of the high voltage-side power line. When the voltage of the high voltage-side power line becomes lower than the lower limit control voltage, this configuration more appropriately increases the driving torque, while more appropriately suppressing a further decrease in voltage of the high voltage-side power line.

In the hybrid vehicle of this aspect, the control device may control the step-up/down converter, such that the voltage of the high voltage-side power line is regulated in a range of not lower than the lower limit control voltage and not higher than an upper limit control voltage that is lower than an allowable upper limit voltage, whether during the predetermined drive or during a drive other than the predetermined drive, and the control device may decrease the upper limit control voltage during the predetermined drive, compared with the upper limit control voltage during the drive other than the predetermined drive. This configuration suppresses the voltage of the high voltage-side power line from becoming higher than the allowable upper limit voltage, compared with a configuration that sets the same value as that during the drive other than the predetermined drive to the upper limit control voltage during the predetermined drive. As a result, this reduces a failure in appropriately regulating the voltage of the high voltage-side power line and reduces an increase in variation of the driving torque.

In this case, when the voltage of the high voltage-side power line becomes higher than the upper limit control voltage during the predetermined drive, the control device may control the engine, such as to rotate the first motor at a lower rotation speed than a rotation speed when the voltage of the high voltage-side power line is not higher than the upper limit control voltage. When the voltage of the high voltage-side power line becomes higher than the upper limit control voltage, this configuration decreases the reverse voltage of the first motor. This accordingly decreases the driving torque, while suppressing a further increase in voltage of the high voltage-side power line.

In this case, when the voltage of the high voltage-side power line becomes higher than the upper limit control voltage during the predetermined drive, the control device may control the engine, such as to rotate the first motor at a rotation speed that decreases with an increase in voltage of the high voltage-side power line. When the voltage of the high voltage-side power line becomes higher than the upper limit control voltage, this configuration more appropriately decreases the driving torque, while more appropriately suppressing a further increase in voltage of the high voltage-side power line.

The following describes the correspondence relationship between the primary components of the embodiment and the primary components of the disclosure described in Summary. The engine 22 of the embodiment corresponds to the "engine", the motor MG1 corresponds to the "first motor", the planetary gear 30 corresponds to the "planetary gear", the motor MG2 corresponds to the "second motor", the inverter 41 corresponds to the "first inverter", the inverter 42 corresponds to the "second inverter", the battery 50 corresponds to the "power storage device", the step-up/down converter 55 corresponds to the "step-up/down converter" and the HVECU 70, the engine ECU 24 and the motor ECU 40 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and so on.

The invention claimed is:

1. A hybrid vehicle, comprising:
   an engine;

a first motor configured to generate a reverse voltage accompanied with rotation;
a planetary gear configured to include three rotational elements that are connected with three axes of the first motor, the engine, and a driveshaft coupled with drive wheels, such as to be arrayed in an alignment chart in a sequence of the first motor, the engine and the driveshaft;
a second motor connected with the driveshaft;
a first inverter configured to drive the first motor;
a second inverter configured to drive the second motor;
a power storage device;
a step-up/down converter connected with a low voltage-side power line that is connected with the power storage device, and with a high voltage-side power line that is connected with the first inverter and the second inverter, and configured such that an electric power is transmitted with a change in voltage between the low voltage-side power line and the high voltage-side power line; and
a control device configured to control the engine, the first inverter, the second inverter and the step-up/down converter, such that the hybrid vehicle is driven with regulating a voltage of the high voltage-side power line in a range of not lower than a lower limit control voltage that is higher than an allowable lower limit voltage, wherein
during a predetermined drive in which the hybrid vehicle is driven with operation of the engine in such a state that the first inverter and the second inverter are shut down, the control device controls the engine and the step-up/down converter such that the hybrid vehicle is driven with output of a torque from the first motor to the driveshaft via the planetary gear by decreasing the voltage of the high voltage-side power line to be lower than a reverse voltage of the first motor in the range of not lower than the lower limit control voltage, and
the control device increases the lower limit control voltage during the predetermined drive, compared with the lower limit control voltage during a drive other than the predetermined drive.

2. The hybrid vehicle according to claim 1,
wherein the control device controls the step-up/down converter, such as to give a lower value of the voltage of the high voltage-side power line at a higher operation amount of an accelerator than a value at a lower operation amount of the accelerator during the predetermined drive.

3. The hybrid vehicle according to claim 1,
wherein when the voltage of the high voltage-side power line becomes lower than the lower limit control voltage during the predetermined drive, the control device controls the engine, such as to rotate the first motor at a higher rotation speed than a rotation speed when the voltage of the high voltage-side power line is not lower than the lower limit control voltage.

4. The hybrid vehicle according to claim 2,
wherein when the voltage of the high voltage-side power line becomes lower than the lower limit control voltage during the predetermined drive, the control device controls the engine, such as to rotate the first motor at a higher rotation speed than a rotation speed when the voltage of the high voltage-side power line is not lower than the lower limit control voltage.

5. The hybrid vehicle according to claim 3,
wherein when the voltage of the high voltage-side power line becomes lower than the lower limit control voltage during the predetermined drive, the control device controls the engine, such as to rotate the first motor at a rotation speed that increases with a decrease in voltage of the high voltage-side power line.

6. The hybrid vehicle according to claim 4,
wherein when the voltage of the high voltage-side power line becomes lower than the lower limit control voltage during the predetermined drive, the control device controls the engine, such as to rotate the first motor at a rotation speed that increases with a decrease in voltage of the high voltage-side power line.

7. The hybrid vehicle according to claim 1,
wherein the control device controls the step-up/down converter, such that the voltage of the high voltage-side power line is regulated in a range of not lower than the lower limit control voltage and not higher than an upper limit control voltage that is lower than an allowable upper limit voltage, whether during the predetermined drive or during a drive other than the predetermined drive, and
the control device decreases the upper limit control voltage during the predetermined drive, compared with the upper limit control voltage during the drive other than the predetermined drive.

8. The hybrid vehicle according to claim 7,
wherein when the voltage of the high voltage-side power line becomes higher than the upper limit control voltage during the predetermined drive, the control device controls the engine, such as to rotate the first motor at a lower rotation speed than a rotation speed when the voltage of the high voltage-side power line is not higher than the upper limit control voltage.

9. The hybrid vehicle according to claim 8,
wherein when the voltage of the high voltage-side power line becomes higher than the upper limit control voltage during the predetermined drive, the control device controls the engine, such as to rotate the first motor at a rotation speed that decreases with an increase in voltage of the high voltage-side power line.

* * * * *